US008409338B2

(12) United States Patent
Kim et al.

(10) Patent No.: US 8,409,338 B2
(45) Date of Patent: Apr. 2, 2013

(54) COOLING SYSTEM

(75) Inventors: Ye Yong Kim, Suwon-si (KR); Dong Joon Choi, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 308 days.

(21) Appl. No.: 12/815,725

(22) Filed: Jun. 15, 2010

(65) Prior Publication Data

US 2011/0027137 A1 Feb. 3, 2011

(30) Foreign Application Priority Data

Jul. 30, 2009 (KR) .................. 10-2009-0069850

(51) Int. Cl.
*B01D 46/00* (2006.01)
(52) U.S. Cl. ............. 96/224; 55/320; 55/385.6; 55/392; 55/392.1; 55/410; 55/428; 55/471; 96/417; 96/420; 361/679.46; 361/679.47; 361/679.48; 361/679.49; 361/688; 361/689; 361/690; 361/694; 361/695; 361/697; 422/24
(58) Field of Classification Search .................. 55/315.2, 55/392.1, 315, 315.1, 392, 399; 96/224, 96/421, 417, 420; 361/679.46, 679.47, 679.48, 361/679.49, 688, 689, 690, 694, 695, 697; 422/24, 186.3, 198
See application file for complete search history.

(56) References Cited

U.S. PATENT DOCUMENTS

| 5,766,316 | A | * | 6/1998 | Gates ............................. 95/273 |
| 6,168,396 | B1 | * | 1/2001 | Homola ................... 417/423.14 |
| 7,329,313 | B2 | * | 2/2008 | Wu ................................. 96/224 |
| 8,016,927 | B2 | * | 9/2011 | Tracy et al. ..................... 96/420 |
| 2004/0191057 | A1 | * | 9/2004 | Lee et al. .................. 415/121.1 |
| 2006/0039113 | A1 | * | 2/2006 | Cheng et al. .................. 361/700 |
| 2009/0139405 | A1 | * | 6/2009 | Schwarz et al. ................ 96/17 |

FOREIGN PATENT DOCUMENTS

| DE | 2416103 | * | 10/1975 |
| DE | 20002124 | * | 4/2000 |
| GB | 1461607 | * | 1/1977 |
| JP | 2000151167 | * | 5/2000 |
| JP | 2003062454 | * | 3/2003 |
| JP | 2008244340 | * | 10/2008 |
| WO | WO 2005055384 | * | 6/2005 |

* cited by examiner

*Primary Examiner* — Duane Smith
*Assistant Examiner* — Sonji Turner
(74) *Attorney, Agent, or Firm* — Morgan, Lewis & Bockius LLP (57) ABSTRACT

The present invention relates to a cooling system. More particularly, the present invention relates to a cooling system for removing dust from air being drawn for cooling heat generation components of an electronic product, for improving convenience in maintenance or repair of the electronic product.

15 Claims, 11 Drawing Sheets

COOLING SYSTEM

CROSS REFERENCE TO RELATED APPLICATION

This application claims the benefit of the Patent Korean Application No. 10-2009-0069850, filed on Jul. 30, 2009, which is hereby incorporated by reference as if fully set forth herein.

BACKGROUND OF THE DISCLOSURE

1. Field of the Disclosure

The present invention relates to cooling systems, and more particularly, to a cooling system for removing dust from air being drawn for cooling heat generation components of an electronic product, for improving convenience in maintenance or repair of the electronic product.

2. Discussion of the Related Art

The present invention relates to cooling systems. Sizes of the electronic products used recently become smaller. Particularly, in a case of the electronic products, like computers and the like, in continuous steps of processing a data and providing a result of the processing by using electric energy, heat is generated. As capability for processing the data is improved, though a quantity of heat generated thus also increases, there has been difficulty in cooling the electronic product since no adequate cooling space is secured for fabricating the electronic product smaller.

In detail, many electronic products still use cooling systems in which external air is drawn to cool down heat generating components which are cooling objects and the external air is discharged to an outside of the electronic product. That is, a method is used in which the heat generating components are cooled down with heat exchange between the heat generating components of the electronic products and the air drawn thereto.

However, the external air contains invisible fine dust. Therefore, if the steps of drawing the air containing the dust and cooling down the heat generating components with the air drawn thus is repeated, the fine dust will stuck to the heat generating components or the components of a cooling unit and an amount of the dust will increases.

However, if the dust is accumulated on the heat generating components and so on, to cut off the heat exchange with the drawn air, the heat generating components is overheated. The dust layer accumulated thus acts as an insulating layer to overheat the heat generating components further, resulting in to an increased rotation speed of a cooling fan or the like for cooling the heat generating components, and fault or malfunction of the heat generating components in long term.

Of course, though there have been attempts for enhancing efficiency of the cooling system and cooling operation by mounting filter or the like to an air inlet of the cooling system for removing the dust from the air being drawn, the dust accumulated on the filter cuts of the air drawing itself, causing a problem similar to the foregoing problem.

SUMMARY OF THE DISCLOSURE

Accordingly, the present invention is directed to cooling system.

An object of the present invention is to provide cooling system for removing dust from air being drawn for cooling heat generation components of an electronic product, for improving convenience in maintenance or repair of the electronic product.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a cooling system includes a filter member, a dust collecting member for separating and collecting dust remained in air passed through the filter member, a cooling fan for blowing air passed through the dust collecting member toward a cooling object, and a guide duct. The guide duct may includes an air inlet with the filter member mounted thereto for drawing external air, a dust collecting portion having the dust collecting member, and a guide portion for guiding the air passed through the dust collecting portion toward the cooling fan.

The air inlet or the dust collecting portion can be formed in a recess portion in an upper side of the guide duct.

The cooling system further includes a heat dissipation member provided between the cooling fan and the cooling object, the heat dissipation member having one side in contact with the cooling object and the other side provided with a plurality of heat dissipation plates or fins.

The dust collecting member can have a curved passage for the air drawn through the air inlet to flow therethrough and for having the dust collected therein.

In this instance, the dust collecting member may includes an air supply hole for introduction of the air drawn through the air inlet and a discharge hole for discharging the air toward the guide portion after the air drawn through the air inlet flows along the curved passage.

In this case, the air supply hole which introduces the air to the dust collecting member is provided in a side of the dust collecting member, and the discharge hole is formed in a center of the dust collecting member opened to an upper side of the dust collecting member.

The dust collecting member can include at least one deflector for dropping movability of the dust contained in drawn air.

The dust collecting member can further include a friction member therein for increasing flow resistance of drawn air.

The friction member may be sponge attached to an inside of the dust collecting member.

The filter member mounted to the air inlet may have a photo-catalyst coating applied thereto.

The photo-catalyst can be titanium dioxide.

The air inlet can include a UV light source provided thereto for directing a UV beam toward the filter member.

The air inlet can be formed in a recess portion in an upper side of the guide duct, and the light source is at least one UV LED device provided on a PCB mounted to an inside of the recess portion.

At least one of the dust collecting member and the dust collecting portion of the guide duct can be coated with a hydrophilic substance.

At least one of the cooling fan and the heat dissipation member can be coated with fluorine.

The cooling system further includes a control unit for detecting blocking of the guide duct to issue an alarm or an alarm signal.

In another aspect of the present invention, a cooling system includes a heat dissipation member having an increased heat dissipation area for absorbing heat from a cooling object, a cooling fan for blowing air to the heat dissipation member, and a guide duct for collecting dust from drawn air in an order of sizes and supplying the air to the cooling fan.

The guide duct can include a filter member for filtering the dust, and a dust collecting member for collecting the dust by increasing a flow resistance.

The filter member or the dust collecting member can be mounted to the guide duct, detachably.

The air introduced to the guide duct can pass through the filter member at first.

Thus, the cooling system of the present invention can improve convenience in maintenance and repair of the electronic product by removing dust from the air drawn for cooling heat generating components of the electronic product.

The cooling system of the present invention can improve a lifetime of components and user's convenience by varying coating material with properties of the components of the cooling system.

The cooling system of the present invention can help convenience of the user as a cleaning time of the cooling system can be informed by using temperature information on the cooling object.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
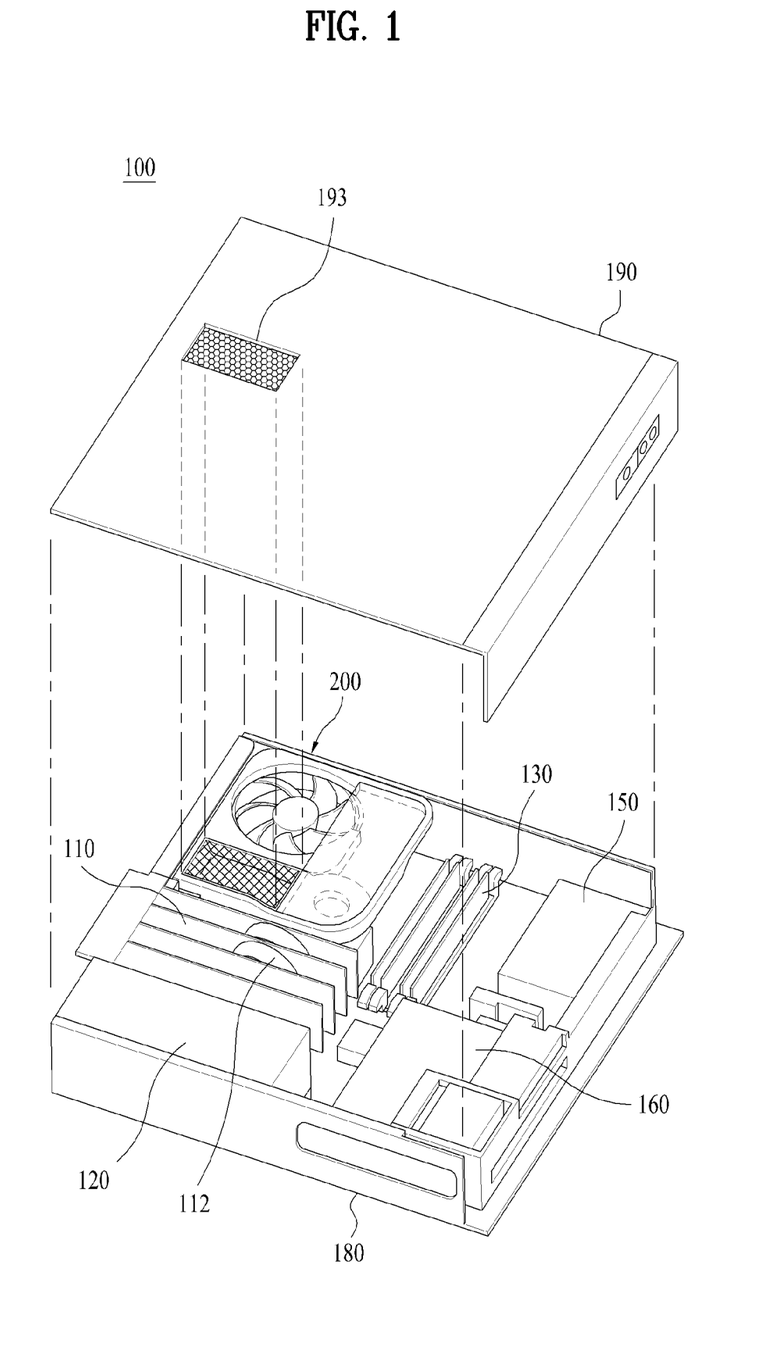
FIG. 1 illustrates an exploded perspective view of a computer having a cooling system in accordance with a preferred embodiment of the present invention mounted thereto.

FIG. 1 illustrates an exploded perspective view of a computer having a cooling system in accordance with a preferred embodiment of the present invention mounted thereto. Of course, the cooling system of the present invention is not applicable limited only to computers. However, since the computer has various fine components which are sensitive to heat, the computer is a typical example to which the cooling system of the present invention is applicable. Though the embodiment illustrated in FIG. 1 takes a desk top computer as an example, the cooling system of the present invention is applicable to any electronic product as far as the electronic product cools components therein with an air cooling system with external air drawn thereto. For an example, since electronic products, such as notebook computers, DVD players, projectors, and printers, also cool down particular components with an air cooling system by a cooling fan, the cooling system of the present invention can be applied thereto. Accordingly, kinds and sizes of heat generating components, there can be a variety of variations of the cooling system of the present invention.

Referring to FIG. 1, an exterior of the desk top computer 100 includes a body case 180 for mounting various components of the desk top computer 100 therein, and a side case 190 mounted to a side of the body for closing an opened side of the body case 180. The side case 190 has one side having an air drawing net 193 formed therein at a position opposite to an air inlet 213 (See FIG. 2) for supplying air to the air inlet 213 of a guide duct to be described later. It is preferable that the side case 190 is mounted to the body case 180 in a state a certain extent of gap is secured between the side case 190 and the air inlet 213 so that the air can be drawn in a vertical direction from the air inlet 213.

In the meantime, the desk top computer 100 has a cooling system 200 of the present invention provided to one side thereof, and includes a plurality of extension cards 110 including a graphic card and the like mounted in PCI slots, a power source unit 120 for supplying a power, a memory card 130 mounted in a memory card slot for temporary storage of data calculated at a CPU (not shown), a storage drive (HDD or SSD) 150 for exchanging data to/from the memory card, an optical drive (ODD) 160 for reading data stored at an optical disk or storing data at the optical disk.

As examples of the extension cards 110, in many cases, the graphic card has a cooling fan individually. The power source unit 120 having a high heat generation rate has a cooling fan individually for cooling for itself.

Of the components of the desk top computer 100, a component that generates heat the most and is sensitive to heat, to require an effective heat dissipation, can be the CPU (not shown).

A performance of a computer is proportional to an operation speed of the CPU, and, if the computers are fabricated by identical fabrication process, the heat generation rate can be proportional to the operation speed. Since the heat generation rate can increase as the operation speed of the CPU increases, a cooling performance is also required to increase.

Figure 2:
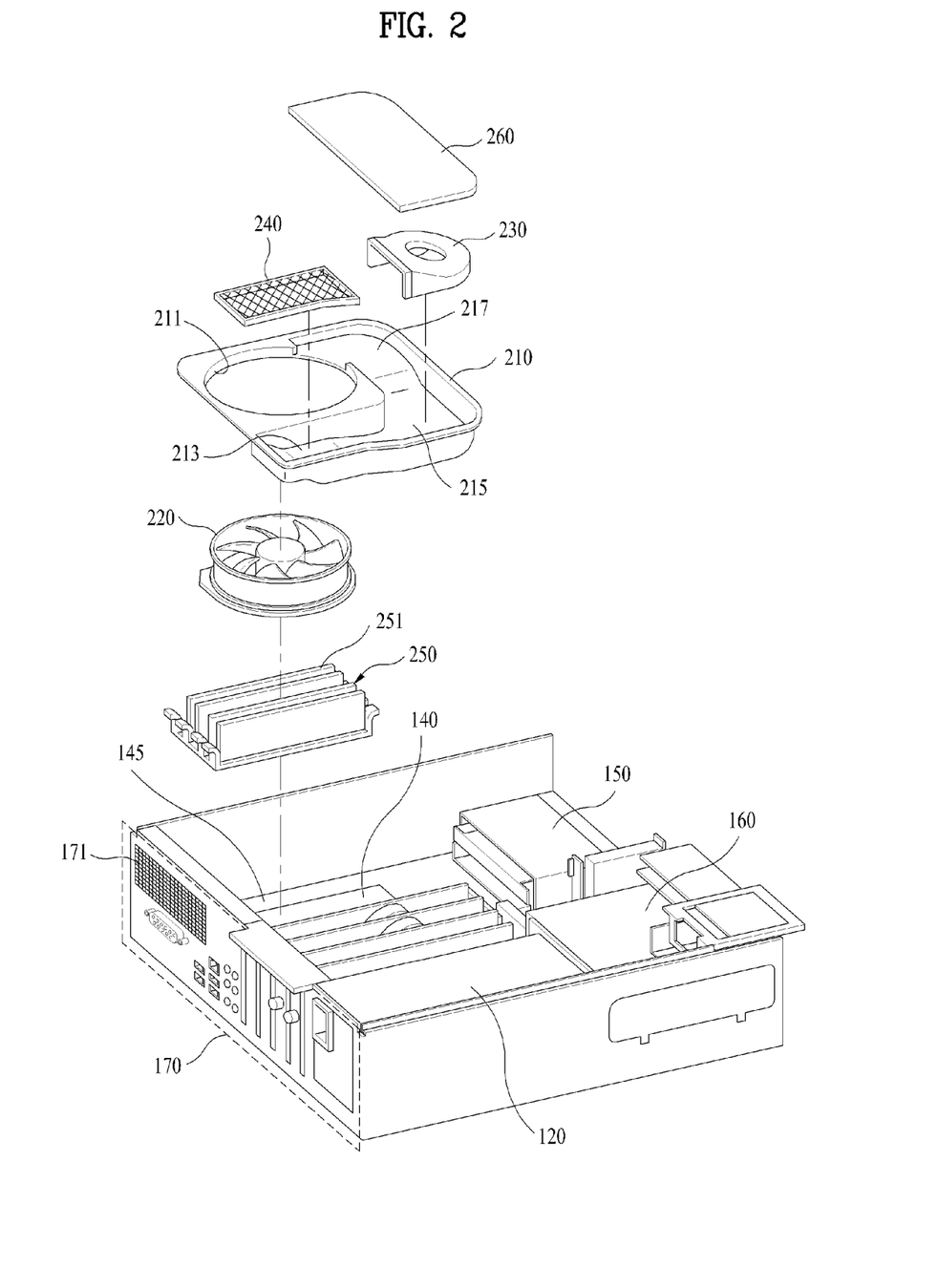
FIG. 2 illustrates an exploded perspective view of a cooling system in accordance with a preferred embodiment of the present invention mounted to a computer.

FIG. 2 illustrates an exploded perspective view of a cooling system in accordance with a preferred embodiment of the present invention mounted to a computer.

As described before, the cooling system 200 of the present invention can be used for cooling a CPU in a desk top computer 100.

Referring to FIG. 2, the CPU 140 is mounted to a main board 145 on a bottom of the body. The cooling system 200 of the present invention for cooling the CPU 140 is assembled to be stacked over the CPU 140.

At first, a heat dissipation member 250 is mounted on the CPU 140. The heat dissipation member 250 has a plurality of heat dissipation fins or heat dissipation plates 251. In the present invention, the heat dissipation member 250 has the plurality of the heat dissipation plates 251. The heat dissipation member 250 absorbs heat from a cooling object, and increases a heat dissipation area.

Referring to FIG. 2, the heat dissipation member 250 has one end in contact with the CPU 140 for absorbing heat from the CPU 140, and the other end for dissipating the heat absorbed at the one end of the heat dissipation member 250 thus.

Mounted on the heat dissipation member 250, there is a cooling fan 220 for blowing air toward the heat dissipation member 250 to help heat dissipation of the heat dissipation member 250. The cooling fan 220 blows air to spaces between the heat dissipation plates 251 of the heat dissipation member 250, making the air blown thus to heat exchange with the heat dissipation plates 251.

Mounted on the cooling fan 220, there is a guide duct 210 for guiding air drawn from an outside to the cooling fan 220. The guide duct 210 includes the air inlet 213 having a filter member 240 mounted thereto for drawing air through the air drawing net 193 (See FIG. 1) in the side case and the filter member 240, a dust collecting portion 215 having a dust collecting member 230 mounted thereto, and a guide portion 217 for guiding the air passed through the dust collecting portion 215 to the cooling fan 220.

The air drawn through the guide duct 210 and being supplied to the cooling fan 220 has the dust therein collected in an order of sizes of particles of the dust.

The air inlet 213, an area for drawing the external air passed through the air drawing net 193 (See FIG. 1) in the side case, has the filter member 240 mounted thereto. The dust collecting portion 215 has the dust collecting member 230 for removing fine particles from the air passed through the filter member 240. The guide portion 217 guides the air for supplying the air having the fine particles removed therefrom at the dust collecting portion 215 to the cooling fan 220. The air inlet 213, the dust collecting portion 215, and the guide portion 217 are sections of a continuous flow passage over the guide duct 210 divided according to services of the units.

The air introduced to the guide duct 210 passes through the filter member 240 at first where particles of the dust having a large size are filtered at first.

The filter member 240 serves to filter large particles of the dust from external air. The filter member 240 has a net form of a filter of which filtering holes may not be large.

Accordingly, after passed through the filter member 240, the external air is supplied to the cooling fan 220. However, as described before, since the air drawn thus contains a large amount of dust, if the computer is used for a long time, the dust can be accumulated on the heat dissipation member 250 and the cooling fan 220. The dust accumulated thus cut off heat exchange between the air and the heat dissipation member 250, making cooling efficiency to cool the cooling object poor.

However, if the filter member 240 is configured to have fine filtering holes, a problem is caused, in which the filter member 240 itself is blocked with fine dust within a short time period.

That is, if the filtering holes of the filter member 240 are fine, leading the filter member 240 that is mounted to secure a cooling performance to cut off the drawing of the air, the cooling efficiency can become poor on the contrary.

Therefore, in order to prevent the fine dust from blocking the filter member 240 and accumulating on the cooling fan 220 or the heat dissipation member 250 thereby resulting in the cooling efficiency poor, the dust collecting member 230 is used.

The dust collecting member 230 increases flow resistance of the air passing through the dust collecting member 230 for collecting the dust.

The dust collecting member 230 serves to collect fine particles of the dust from the air of a state the large particles of the dust are filtered therefrom by the filter member 240. A method of the dust collecting member 230 for collecting the fine dust from the air will be described in detail, later.

The cooling system 200 of the present invention has a cover member 260 for covering the dust collecting portion 215 and the guide portion 217. The cover member 260 serves to make the air passed through the dust collecting portion 215 to flow following a fixed flow passage in a process the air is supplied to the guide portion 217.

The air passed through the guide duct 210 is blown toward the heat dissipation member 250 by the cooling fan 220 to heat exchange with, and cool down the heat dissipation member 250, and discharged through an air outlet 171 formed in a rear side 170 of the body 180.

Figure 3A:
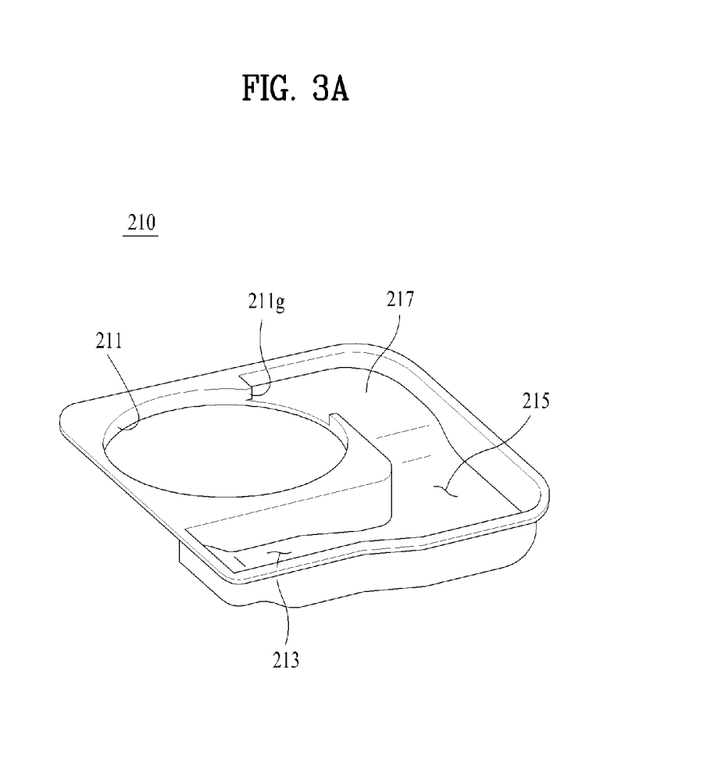
FIGS. 3A and 3B illustrate a perspective view and a plan view each showing a guide duct in a cooling system in accordance with a preferred embodiment of the present invention.
Figure 3B:
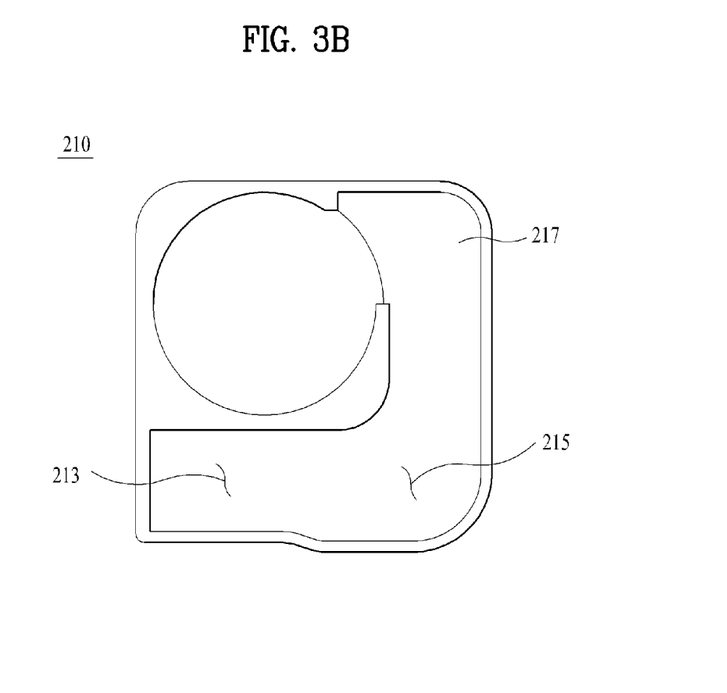

FIGS. 3A and 3B illustrate a perspective view and a plan view each showing a guide duct 210 in a cooling system 200 in accordance with a preferred embodiment of the present invention. The guide duct 210 may be an injection molding of resin. In order to mount the filter member 240 to the air inlet 213 and the dust collecting member 230 to the dust collecting portion 215 (See FIG. 2), the air inlet 213 and the dust collecting portion 215 are provided on an upper side of the guide duct 210 in a shape of a seating groove or a recess.

As described before, the guide duct 210 supplies the air toward the cooling fan 220 through the guide portion 217. As shown in FIG. 2, since the guide duct 210 has a structure in which the guide portion 217 is placed on the cooling fan 220 and is in communication with the guide portion 217, the guide duct 210 has an opening 211 at a portion facing the cooling fan 220 for making easy introduction of the air to the cooling fan 220. There is an inlet 211g formed in a portion of a vertical wall that partitions the opening 211 from the guide portion 217 formed by cutting out the vertical wall. The inlet 211g is formed so that the air is drawn to the opening 211 through the guide portion 217.

Referring to FIG. 3, the opening 211 in the guide duct 210 is partitioned by the air inlet 213, the dust collecting portion 215, the guide portion 217 and the vertical wall. The opening 211 in the guide duct 210 is partitioned by the air inlet 213, the dust collecting portion 215, the guide portion 217 and the vertical wall, for preventing the air flowing along the air inlet 213, the dust collecting portion 215, and the guide portion 217 from being introduced to the cooling fan 220 without passing through the dust collecting portion 215.

Accordingly, the inlet 211g formed in the vertical wall that partitions the opening 211 makes only air that passes through the guide portion 217 to be supplied to the cooling fan 220.

Since it is required that the air introduced to the air inlet 213 perpendicular thereto changes a flow direction for being supplied to the dust collecting member 230 (See FIG. 2) in the dust collecting portion 215, it is required that the air inlet 213 has a certain range of recess depth. Moreover, since the dust collecting portion 215 also is required to secure a space for seating the dust collecting member 230 therein, the dust collecting portion 215 is also required to secure a certain range of recess depth.

Figure 4A:
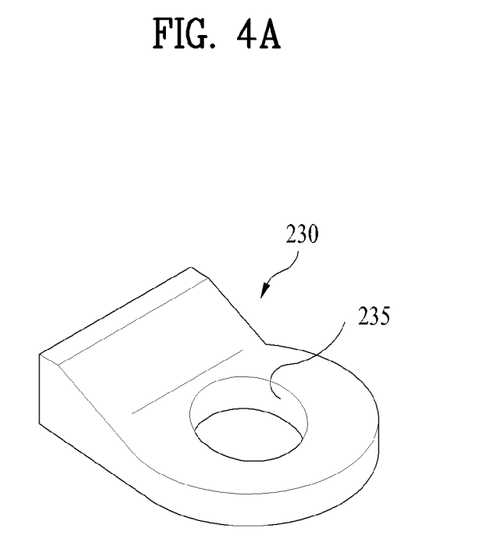
FIGS. 4A to 4E each illustrates a dust collecting member seen from various angles.

The structure and operation of the dust collecting member 230 of the cooling system 200 in accordance with one of the embodiments of the present invention will be described with reference to FIGS. 4A to 4E. In more detail, FIG. 4A illustrates a perspective view of the dust collecting member 230, FIG. 4B illustrates a bottom view of the dust collecting member 230, FIG. 4C illustrates an air inlet side view of the dust collecting member 230, FIG. 4D illustrates a plane view of the dust collecting member 230, and FIG. 4E illustrates a longitudinal section of the dust collecting member 230.

The dust collecting member 230 has an air supply hole 231 for introducing the air drawn through the air inlet 213. The air supply hole 231 is opened in a direction of the air inlet 213. The air drawn through the air inlet 213 is drawn into the dust collecting member 230 through the air supply hole 231.

The dust collecting member 230 shown in each of FIGS. 4A to 4E has a discharge hole 235 formed in a center portion through which the air drawn through the air inlet 213 is discharged to the guide portion 217 after flowing along a curved passage 216. The dust collecting member 230 has the curved passage 216 formed therein for flowing of the air. The curved passage 216 is provided for collecting the fine particles of the dust as the fine particles of the dust drop by gravity or friction with an inside surface of the dust collecting member 230 in a course of air flow. That is, the curved passage 216 drops kinetic energy of the air flowing therethrough or induces the air to cause friction with an inside wall surface of the dust collecting member 230 for collecting the dust.

Figure 4B:
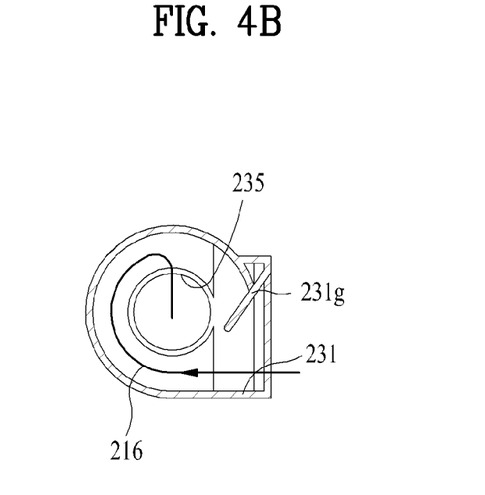
Figure 4C:
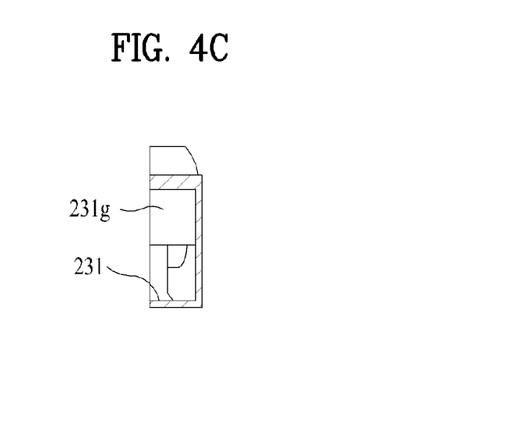
Figure 4D:
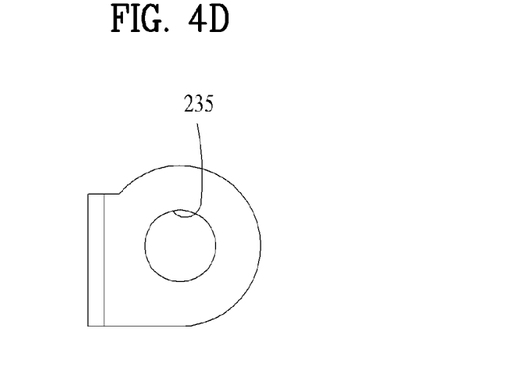
Figure 4E:
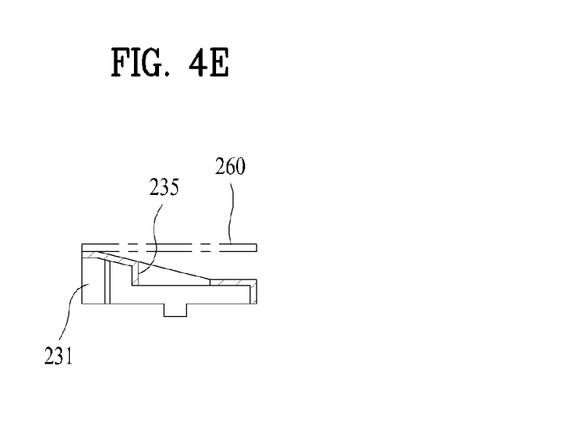

Referring to FIG. 4B, the dust collecting member 230 has an air supply guide 231g formed on an inside of the air supply hole 231. The air supply guide 231g is formed for fixing a direction of entrance of the air into the curved passage 216. The air supply guide 231g is a guide member sloped with respect to the air supply hole 231.

The air supply guide 231g mounted to the air supply hole 231 for guiding the air such that the air can enter into the dust collecting member 230 following the curved passage 216.

Referring to FIG. 4B, the curved passage 216 in the dust collecting member 230 is an inside space between an outside wall of the dust collecting member 230 and an inside wall of the dust collecting member 230, which forms the discharge hole 235 in the center portion of the dust collecting member 230.

Accordingly, since the inside wall and the outside wall are circular, with a predetermined space therebetween, the flow passage of the air also forms the curved passage 216.

The air introduced to the curved passage 216 constructed of the inside wall and the outside wall hits the outside wall and the inside wall, dropping the fine particles of the dust floating in the air. The air loses kinetic energy thereof in a course of flowing through the curved passage 216, and drops down by gravity, to collect the dust. Since the air is involved in slow down of a flow speed during the air flows along the curve flow passage, the air can be discharged toward the discharge hole 235 after flowing along the curved passage 216.

Thus, the dust is collected in the course of the air flow along the curved passage 216, and the air can be discharged toward the guide portion 217 through the discharge hole 235.

The air discharged through the discharge hole 235 flows toward the guide portion 217. As shown in FIG. 4, the discharge hole 235 is a vertical pass through hole. As shown in FIG. 2, there is the cover member 260 which covers the dust collecting portion 215 and the guide portion 217 to cover the air flow passage. The cover member 260 may be mounted to be in contact with an upper side of the dust collecting member 230.

Referring to FIG. 4E, since the dust collecting member 230 has a sloped upper side, the air from the discharge hole 235 can not move to other place, but move toward the guide portion 217 owing to the cover member 260 which is mounted in a horizontal position in contact with an uppermost surface of the dust collecting member 230.

That is, the cover member 260 can prevent the air drawn through the air supply hole 231 and the air discharged through the discharge hole 235 from mixing.

The slope of the upper surface of the dust collecting member 230 declines from the air supply hole 231 toward a direction of the air supply for easy supply of the air toward the guide portion 217 and securing an area of the air supply hole 231, adequately.

Figure 5:
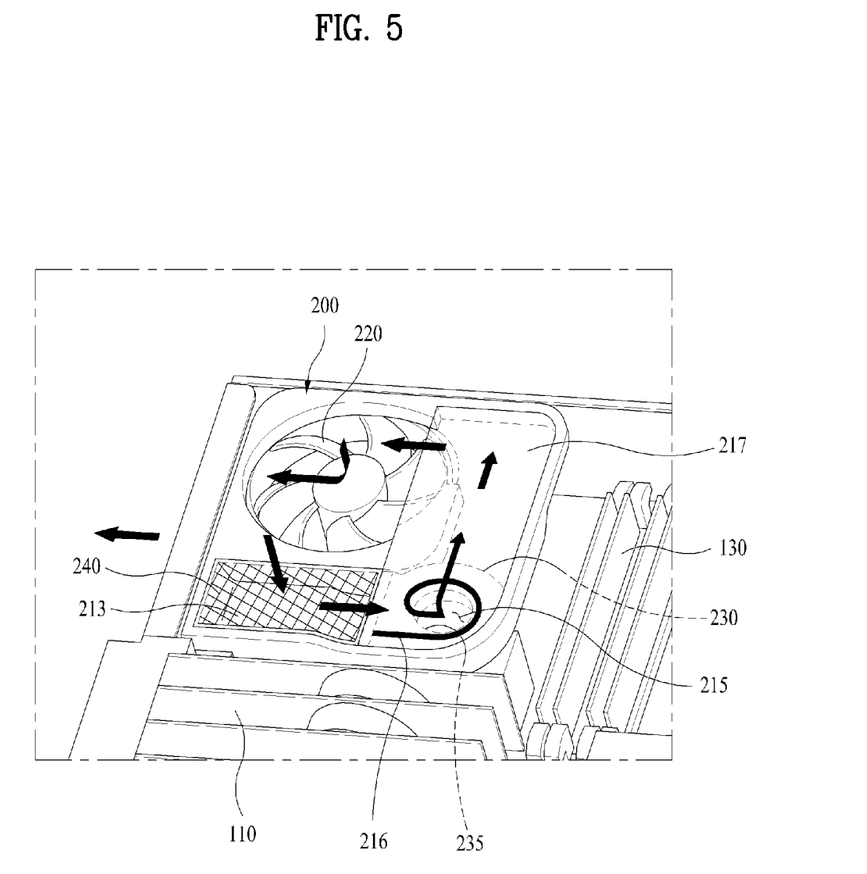
FIG. 5 illustrates a perspective view of a cooling system in accordance with a preferred embodiment of the present invention, showing an air flow drawn into the cooling system.

FIG. 5 illustrates a perspective view of a cooling system in accordance with a preferred embodiment of the present invention, showing an air flow drawn into the cooling system.

Large particles of the dust is filtered from the air as the air is drawn into the air inlet 213 having the filter member 240 mounted thereto. The air drawn through the air inlet 213 is supplied to the dust collecting member 230 in the dust collecting portion 215, and flows following the curved passage 216 formed in the dust collecting member 230 to have the fine dust collected therein, and is discharged through the discharge hole 235 in a center of the dust collecting member 230.

The air discharged through the discharge hole 235 thus is guided to the guide portion 217, and supplied toward the inlet 211g formed by cutting out a portion of the vertical wall which partitions the guide portion 217 (See FIG. 3).

The air supplied toward the cooling fan 220 is blown toward the heat dissipation member 250 under the cooling fan 220, and heat exchanges with the heat dissipation plates 251 of the heat dissipation member 250, thereby cooling the cooling object (See FIG. 2).

The air heat exchanged with the heat dissipation member 250 is discharged to an outside of the cooling system 200.

The air supplied to the cooling system 200 passes through the filter member 240 and the dust collecting member 230 for removing the dust from the air in an order proportional to particle sizes of the dust, and is supplied to the cooling fan 220.

Eventually, the filter member 240 is not blocked easily, amounts of the dust accumulated on the heat dissipation member 250 and so on can be minimized.

Moreover, by removing the dust from the filter member 240 and the dust collecting member 230, the cooling system 200 can maintain optimum performance.

Accordingly, it is preferable that the filter member 240, the dust collecting member 230, or the cover member 260 is mounted to the cooling system 200, detachably.

Figure 6:
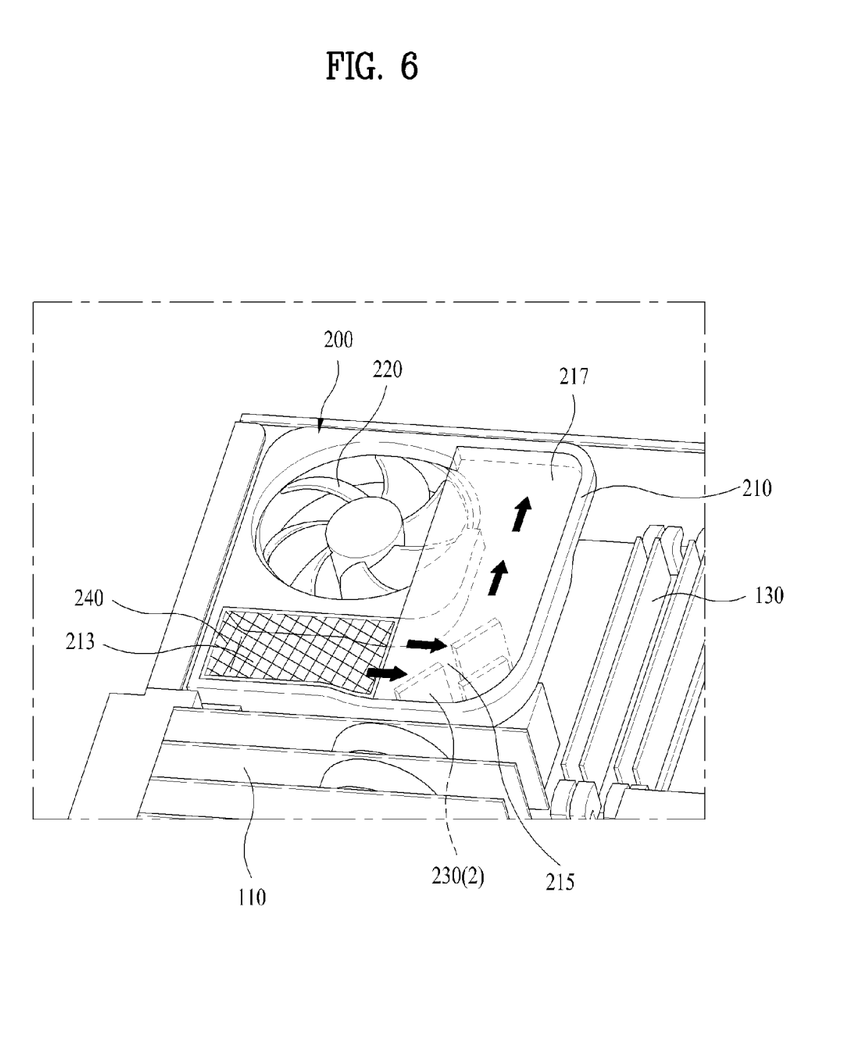
FIG. 6 illustrates a perspective view of a cooling system in accordance with another preferred embodiment of the present invention, showing an air flow drawn into the cooling system.

FIG. 6 illustrates a perspective view of a cooling system in accordance with another preferred embodiment of the present invention, showing an air flow drawn into the cooling system. Description of parts identical to the cooling system 200 and common configurations described with reference to FIGS. 2 to 5 will be omitted.

Referring to FIG. 6, different from the dust collecting member 230 described with reference to FIGS. 2 to 5, the dust collecting member 230(2) in the dust collecting portion 215 is, not a type which collects the dust from the air in a course of an air flow through the inside of the curved passage 216, but a type which drops movability of the fine dust by making the air to hit a deflector mounted substantially vertically in the dust collecting portion 215.

Therefore, the dust collecting member 230(2) has at least one partition. In the embodiment shown in FIG. 6, the dust collecting member 230 has three deflectors mounted spaced from each other sloped with respect to the air flow direction so that the air can flow to the guide portion 217 after the air hits the deflectors.

Therefore, the air drawn through the air inlet 213 is introduced to the dust collecting portion 215, hits the dust collecting member 230(2) of the deflector type to have the fine dust collected therein, and is guided to the guide portion 217.

Figure 7:
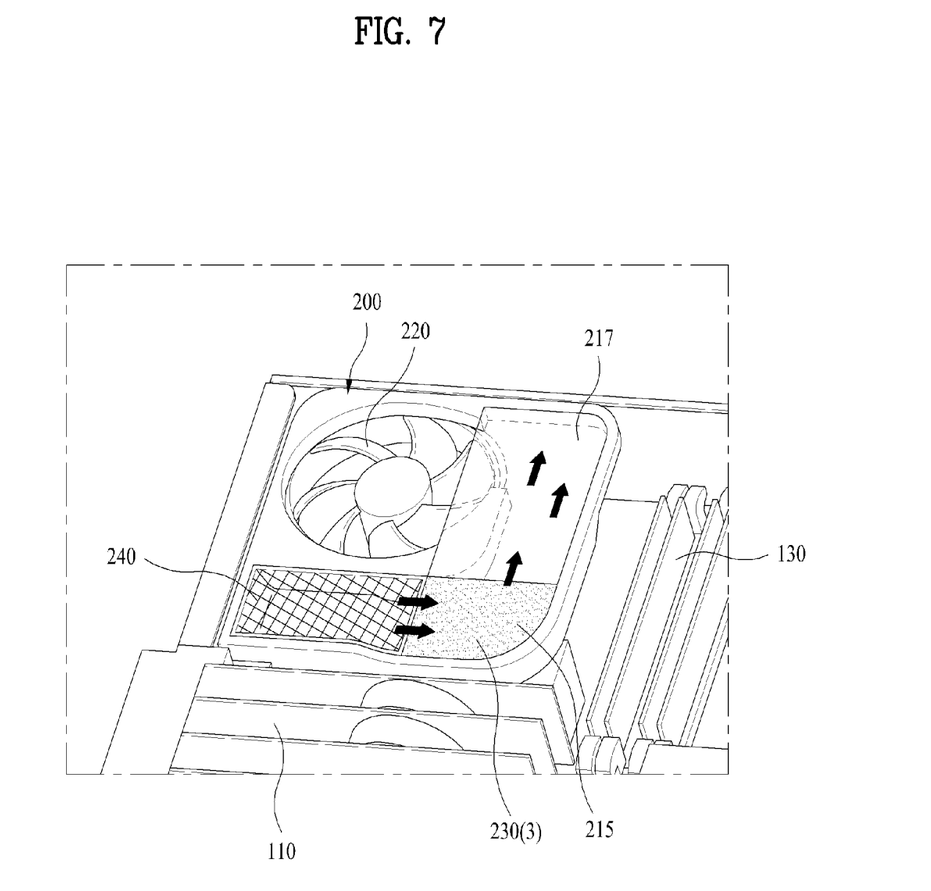
FIG. 7 illustrates a perspective view of a cooling system in accordance with another preferred embodiment of the present invention, showing an air flow drawn into the cooling system.

FIG. 7 illustrates a perspective view of a cooling system in accordance with another preferred embodiment of the present invention, showing an air flow drawn into the cooling system. Description of parts identical to the cooling system 200 and common configurations described with reference to FIGS. 2 to 6 will be omitted.

Referring to FIG. 7, different from the dust collecting member 230 described with reference to FIGS. 2 to 6, the dust collecting member 230(3) in the dust collecting portion 215 is, not the type which collects the dust from the air in a course of an air flow through the inside of the curved passage 216, or the type which collects the fine dust from the air by making the air to hit a deflector, but a type which collects the dust by increasing flow resistance of the air that is made to flow through a friction member, such as sponge placed on a bottom of the dust collecting portion 215.

Therefore, the air introduced to the dust collecting portion 215 is collected in the dust collecting portion 215 at the dust collecting member 230(3), such as sponge attached to the bottom and can be supplied to the guide portion 217.

The air has a speed gradient between an upper portion and a lower portion of air flow which becomes great owing to the dust collecting member 230(3) in a course of flow above the dust collecting member 230(3), changing the air flow to be irregular to have the fine dust collected at the dust collecting member 230(3).

In the embodiment described with reference to FIG. 7, though it is shown that the dust collecting member 230(3) is attached only to the bottom of the dust collecting portion 215, the dust collecting member 230(3) may be mounted to cover an entire inside walls of the dust collecting portion 215. Then, the air introduced to the dust collecting member 230(3) has the dust therein collected in a course of passing through the flow passage surrounded by the sponge, dust collecting efficiency can be improved.

Figure 8A:
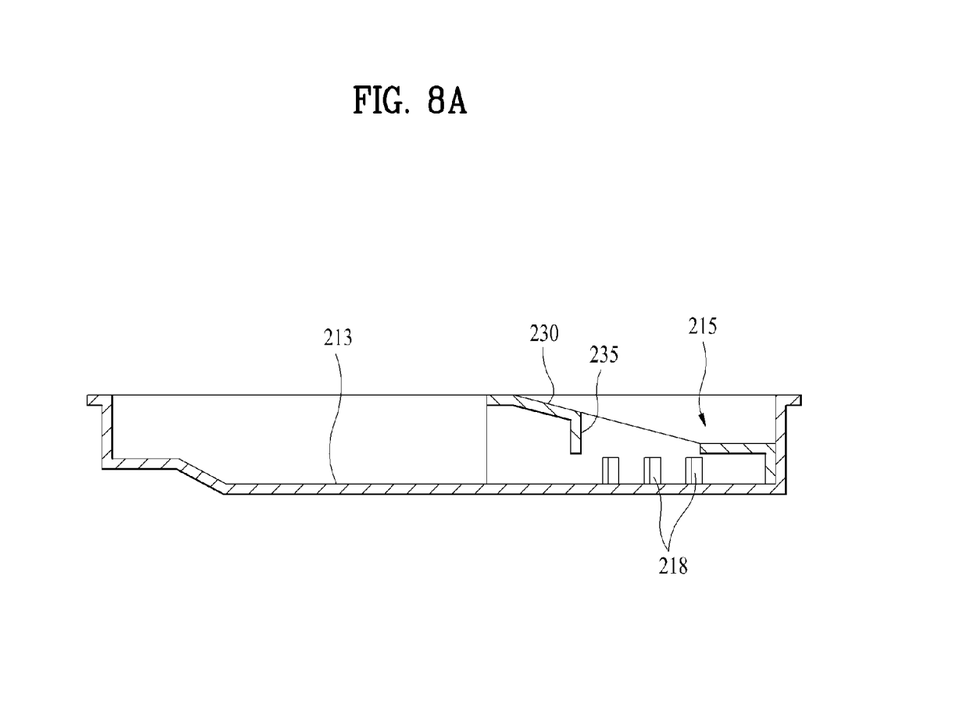
FIGS. 8A and 8B illustrate sections of a cooling system in accordance with another preferred embodiment of the present invention, respectively.
Figure 8B:
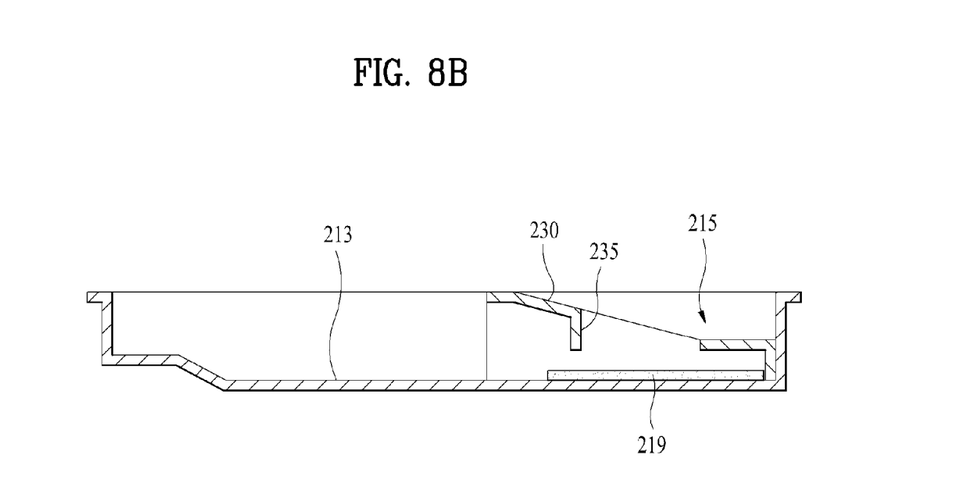

FIG. 8 illustrates a perspective view of a cooling system in accordance with another preferred embodiment of the present invention, showing an air flow drawn into the cooling system. Description of parts identical to the cooling system and common configurations described with reference to FIGS. 2 to 7 will be omitted.

The dust collecting member 230 in the dust collecting portion 215 uses a method of collecting the dust from the air by making the air to hit the deflector mounted substantially vertically in the dust collecting member 230 or the method of collecting the dust from the air by increasing flow resistance of the air which is made to flow friction member, such as sponge attached to the bottom, together with the type of collecting the dust from the air in a course of flowing through the curved passage.

In detail, the dust collecting member 230 shown in FIG. 8A may have a plurality of deflectors 218 vertical to the bottom of the dust collecting member 230 having the curved passage. Therefore, a more efficient dust collecting operation can be carried out by the friction taken place at the inside and outside walls of the dust collecting member 230 with the air flowing along the curved passage and the flow resistance caused by the deflectors 218.

The dust collecting member 230 shown in FIG. 8B has the sponge S attached to the bottom of the dust collecting member 230 having the curve passage. Accordingly, since the flow resistance can increase, the fine dust can be collected more efficiently.

The deflectors 218 and the sponge 219 mounted to an inside of the dust collecting member 230 shown in FIG. 8A or 8B additionally may have heights lower than the deflectors and the sponge in the dust collecting member 230 shown in FIG. 6 or 7. Since the deflectors 218 and the sponge 219 mounted to an inside of the dust collecting member 230 shown in FIG. 8A or 8B additionally is required to be mounted on the bottom and so on of the inside of the dust collecting member 230, it is preferable that the heights are lower than a case when the deflectors 218 or the sponge 219 is used, individually.

Figure 9:
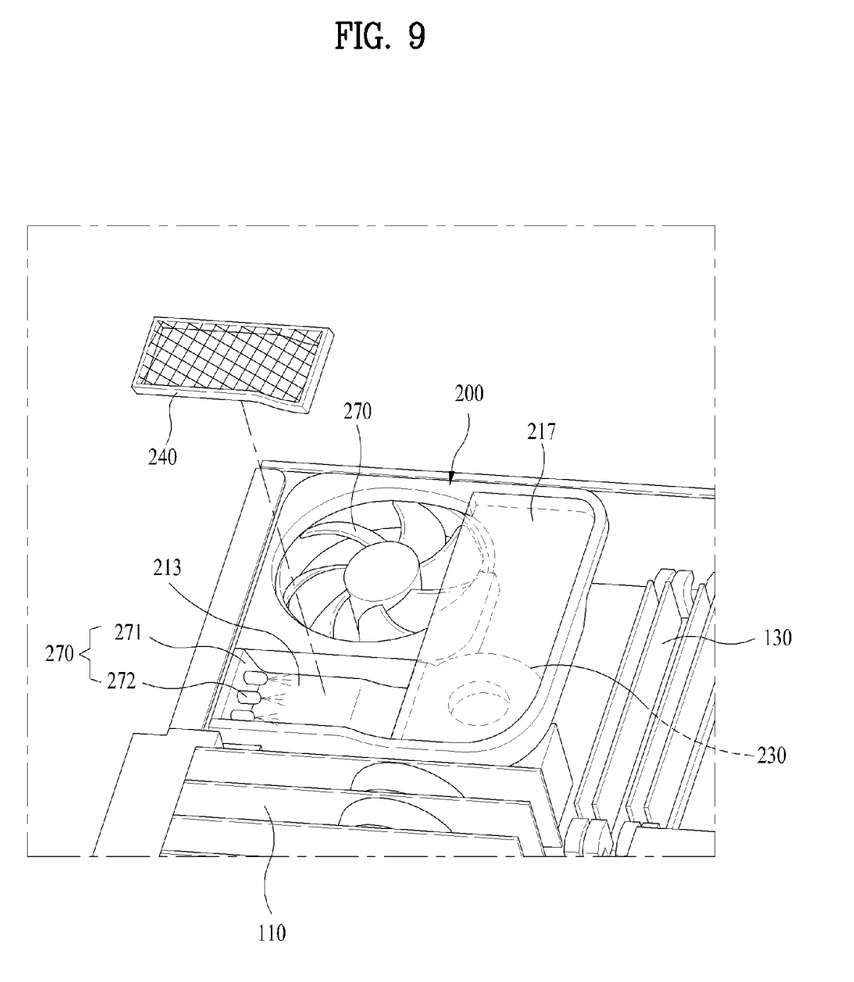
FIG. 9 illustrates a perspective view of a cooling system in accordance with another preferred embodiment of the present invention.

FIG. 9 illustrates a perspective view of a cooling system 200 in accordance with another preferred embodiment of the present invention. The filter member 240 on the air inlet 213 of the cooling system 200 has a coat of photo-catalyst and at least a UV light source 270 mounted to an inside wall of the air inlet 213.

In the embodiment shown in FIG. 9, the UV light source 270 may be an UV LED device 272 mounted to a PCB 271 mounted to the inside surface of the air inlet 213. Since the air inlet 213 is recessed in a certain extent, the PCB 271 can be mounted to the inside surface of the air inlet 213.

As an example of the photo-catalyst coated to the filter member 240, there can be titanium dioxide $TiO_2$. The photo-catalyst coating serves to disintegrate organic compounds, such as volatile organic compounds VOC contained in the air.

The titanium dioxide $TiO_2$ used as a material of the photo-catalyst coating forms electrons and electron holes as an n-type semiconductor upon reception of a UV beam (a wave with a wavelength in the vicinity of 400 nm), to form hydroxy radical —OH and super oxide which have strong oxidizing power.

The hydroxy radical —OH and super oxide make oxidizing disintegration of the organic compounds into water and carbon dioxide.

By this principle, the hydroxy radical —OH and super oxide make oxidizing disintegration of pollutants in the air into harmless water and carbon dioxide, and organic compounds which are pollutants in water into water and carbon dioxide. Moreover, since microbes are also organic compounds, the microbes are also subjected to oxidizing disintegration by the strong oxidizing power of the photo-catalyst to sterilize the microbes. In order to clean the air, a combination of the filter member 240 having the photo-catalyst coated thereon and the UV light source is made to make oxidizing disintegration of the organic compounds contained in the air into harmless water and carbon dioxide.

Particularly, the volatile organic compounds VOC are a collective name of liquid or gaseous organic compounds having high vapor pressures that vaporize into air easily, which are substances which causes photochemical reaction in the air to produce photochemical oxidizing substances, such as ozone, which causes photochemical smog. Since the volatile organic compounds VOC is substances which cause, not only the air pollution, but also cancers, and global warming, every country manages to reduce discharge of the substances as policy. There are a variety of the volatile organic compounds VOC, such as solvent used in industry, starting from benzene, acetylene, and gasoline. Therefore, if the organic compounds are drawn and used in cooling the cooling objects and discharged into a room in which the electronic product is in use, since the organic compounds can be accumulated on the cooling objects or the cooling system to make cooling efficiency poor or contaminate room air, a method for removing the organic substances from sources is required.

In the embodiment shown in FIG. 9, if a UV beam is directed toward the filter member 240 having the photo-catalyst coating applied thereto by using the UV light source 270, the organic compounds contained in the air can be removed, more effectively.

If the organic compounds, such as the VOC, are disintegrated, since an amount of the dust accumulated on the filter member 240 or the dust collecting member 230 can be reduced, the disintegration can help maintenance of the cooling system.

That is, though the cooling system 200, having the dust collecting portion 215 separately for collecting dust, can reduce the amount of the dust accumulated on the heat dissipation member 250 or the cooling fan 220, since there is no change of an absolute amount of the dust in the air drawing into the cooling system 200, a method can be used additionally for disintegrating the organic compounds which occupies a certain portion of the dust.

Eventually, the reduction of the absolute amount of the dust introducing into the cooling system 200 by using the photo-catalyst coating to reduce a rate of accumulation of the dust on the dust collecting portion 215 and the like can provide convenience to the user.

The filter member 240 coated with the photo-catalyst substance can disintegrate the organic compounds. Since the filter member 240 is a part through which the dust passes at first as a nature of the filter member 240, a coating substance can be selected for disintegrating the organic compounds.

Therefore, besides the filter member 240, the cooling system 200 of the present invention has components which are required to prevent the dust in the air from accumulating thereon as natures of the components, and opposite to this, components which are required to accumulate the dust in the air thereon as natures of the components.

That is, in a case of the dust collecting member 230 of the cooling system 200, since the dust collecting member 230 is a component for collecting the dust, it is preferable that the dust collecting member 230 has a nature for accumulating the dust, and, since the cooling fan 220 or the heat dissipation member 250 or the like shows a poor cooling performance if the dust is accumulated thereon, it is preferable that the cooling fan 220 or the heat dissipation member 250 or the like has a nature for preventing the dust from accumulating thereon.

The heat dissipation member 250 is formed of a metal having high heat conductivity, and the cooling fan 220 is formed of plastic for minimizing a motor load. That is, materials of the components are fixed already, in order to change dust accumulating tendencies of the components, the heat dissipation member 250 or the cooling fan 220 can be coated to have a specific nature.

For an example, the dust collecting member 230 and components of the dust collecting portion 215 can be coated with a hydrophilic material, and the cooling fan 220 and the heat dissipation member 250 can be coated with a hydrophobic material.

A hydrophilic property is a tendency able to bond with water molecules, easily. In general, since the hydrophilic substance has a polarity, particle like floating substances, such as the dust, are adsorbed thereto, easily. Opposite to this, a hydrophobic property is a tendency unable to bond with the water molecules, easily. In general, since the hydrophobic substance has no polarity, particle like floating substances, such as the dust, are unable to stick thereto easily, and even if the dust sticks thereto, the dust drops therefrom, easily.

Accordingly, since it is preferable that the dust collecting member 230 in the dust collecting portion 215 has a property for adsorbing the dust easily, components of the dust collecting portion 215 including the dust collecting member 230 may be coated with the hydrophilic substance, as an example, $SiO_2$. Some of the hydrophilic coatings achieve the hydrophilic property by means of action of a photo-catalytic substance dispersed in a silicon containing bonding agent. For an example, there can be particle like photo-catalyst dispersed in a coating forming element, wherein the photo-catalyst can be titanium dioxide particles used in a form of anatase or rutil. The coating forming element can form a coating of a silicon resin when the coating forming element is set, and can be organic poly-siloxane produced by polycondensation in succession to partial hydrolysis of hydrolytic silane.

Opposite to this, the heat dissipation member 250 and/or the cooling fan 220 can be coated with fluorine resin having an excellent hydrophobic property so that the dust is not accumulated thereon. As described before, the hydrophobic substance has anti-fouling property. In detail, the heat dissipation member 250 and/or the cooling fan 220 can be coated with fluorine by thermo-fusion of fluorine resin, coating fluorine resin composition of two fluid setting type including acryl-group polymer as an anti-fouling coating agent, or coating with a polyvinylidene fluoride group hot melting fluorine resin composition. If the cooling fan 220 or the heat dissipation member 250 is coated with a hydrophobic substance, such as fluorine coating, the accumulation of the fine dust can be delayed or prevented.

In addition to this, the cooling system 200 of the present invention can be configured to sense blocking of any one of the air inlet 213 for introducing the air to the cooling system 200, the dust collecting portion 215 for collecting the dust, and the guide portion 217 for guiding the air drawn through the dust collecting portion 215 to the cooling fan 220, and to guide the user to clean the cooling system.

Figure 10:
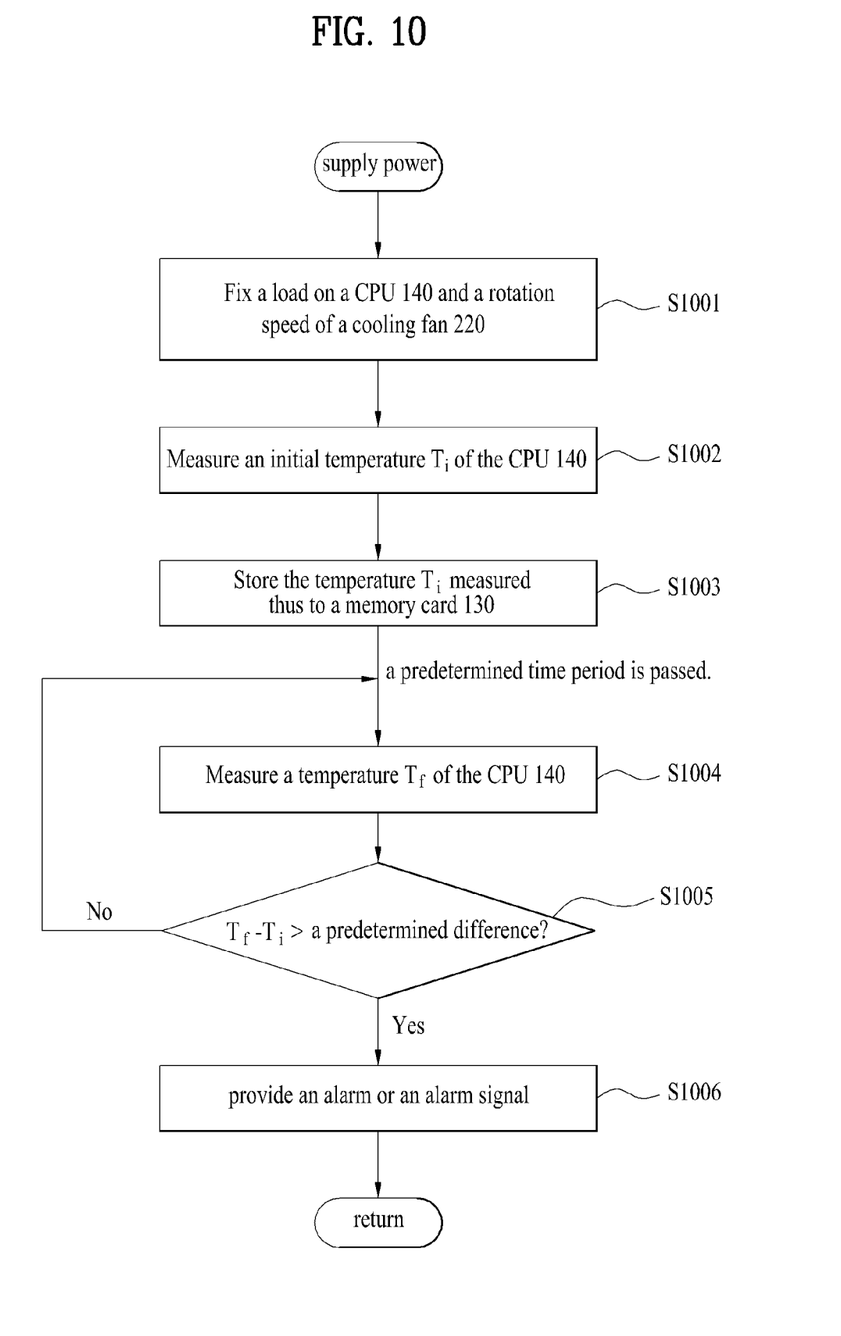
FIG. 10 illustrates a flow chart showing the steps of a process for guiding a cleaning time of a cooling system in accordance with a preferred embodiment of the present invention to a user.

FIG. 10 illustrates a flow chart showing the steps of a process for guiding a cleaning time of a cooling system in accordance with a preferred embodiment of the present invention to a user. A process for guiding a cleaning time of a cooling system 200 to the user will be described with reference to FIG. 10, in detail.

If at least one of the air inlet 213 through which the air flows, the dust collecting portion 215 and/or the guide portion 217 is blocked with the dust, the air can not flow toward the cooling fan 220 smoothly, and if the rotation speed of the cooling fan 220 is the same with before, temperatures of the cooling objects and the CPU 140 (See FIG. 2) can be measured high. That is, due to poor cooling, the temperatures rise. Of course, it is under the assumption that an output or a load of the CPU 140 is the same with before.

Therefore, in order to determine an extent of blocking of the air inlet 213, the dust collecting portion 215 and/or the guide portion 217, a step for setting a reference value is required.

In an electronic product to which the cooling system 200 of the present invention is mounted, a control unit (not shown) of the electronic product maintains the load (or output) on the CPU 140 at a fixed level. That is, the control unit controls the electronic product to put a fixed load on the CPU 140 by using an application program stored in a memory thereof (S1001).

Along with this, the control unit fixes the rotation speed of the cooling fan 220 at a predetermined value. For an example, the control unit can control the cooling fan 220 such that the cooling fan 220 maintains a rotation speed of 4000 RPM. In this instance, by fixing the load on the CPU 140 and the rotation speed of the cooling fan 220 which influence to the temperature of the CPU 140, a temperature change of the CPU 140 can be determined, accurately.

The control unit can measure the temperature $T_i$ of the CPU 140 with a temperature sensor (not shown) in a state both the load on the CPU 140 and the rotation speed of the cooling fan 220 are fixed (S1002).

Once the temperature $T_i$ of the CPU 140 is measured, the control unit stores the temperature $T_i$ of the CPU 140 at the memory card 130 (See FIG. 1) (s1003). It is preferable that temperature distributions for different loads and rotation speeds are stored therein further. In this instance, the control unit may store the temperatures of the CPU 140 versus aperture ratios of the air inlet 213, the dust collecting portion 215 and/or the guide portion 217 are stored in a form of a table. Such reference values can be determined in advance according to user's preference.

That is, in a state the air inlet 213, the dust collecting portion 215 and/or the guide portion 217 are not blocked, the control unit determines the load or the output directly related to a performance of the CPU 140, and the rotation speed of the cooling fan 220 accordingly, the control unit can determine the load and the rotation speed as the reference values.

For an example, if the load on the CPU 140 and the rotation speed of the cooling fan 220 are set to be 60% and 3500 RPM respectively, and the temperature of the CPU matched to the load and the rotation speed set thus is stored in the memory of the control unit, if conventional operation of the computer and so on is started, the control unit operates the computer at the load and the rotation speed of the cooling fan 220 set thus. After a certain time period is passed, the control unit measures a temperature $T_f$ of the CPU 140 again (S1004), and compares the temperature $T_f$ measured thus to the temperature $T_i$ stored in the memory of the control unit (S1005).

If the temperature $T_f$ measured thus is higher than to the temperature $T_i$ stored in the memory, implying that the dust is accumulated on the air inlet 213, the dust collecting portion 215 and/or the guide portion 217, removal of the dust is required.

Accordingly, by comparing the temperature $T_i$ in a normal condition when no dust is accumulated to the temperature $T_f$ in the conventional operation, the blocking of the air inlet 213, the dust collecting portion 215 and/or the guide portion 217 can be determined.

If a difference of the temperature $T_f$ measured thus and the temperature $T_i$ stored in the control unit is below a predetermined value, it implies that the amount of the dust accumulated on the air inlet 213, the dust collecting portion 215 and/or the guide portion 217 is not much, enabling a smooth flow of the air, still. Therefore, in this case, the temperature $T_f$ of the CPU 140 is measured again after a predetermined time period is passed (S1003).

Opposite to this, if the difference of the temperature $T_f$ measured thus and the temperature $T_i$ stored in the control unit is maintained to be a value higher than a predetermined value, it is preferable that the control unit provides an alarm or an alarm signal to the user for cleaning the air inlet 213, the dust collecting portion 215 and/or the guide portion 217 (S1006).

The alarm or the alarm signal may be issued by using a speaker (not shown) mounted to a main board mb and/or a display unit (not shown), such as a monitor.

Eventually, different from the related art cooling system, the cooling system of the present invention can delay the cutting off of drawing of the air due to accumulation of the dust at the filter member 240 to the maximum by separating the filer member 240 which filters the dust at first from the dust collecting portion 215, and can delay or prevent accumulation of the fine dust on the heat dissipation member 250 since the fine dust is collected at the dust collecting portion 215. Moreover, by coating the air inlet 213, the dust collecting portion 215 and/or the guide portion 217 with a material suitable for service thereof, an antifouling property or a dust collecting property thereof can be improved, and an absolute amount of the dust contained in the air can be reduced by disintegrating the organic compounds.

Moreover, since the control unit can inform a cleaning time of the cooling system by using the rotation speed of the cooling fan 220 and the temperature information on the load or output of the CPU, the cooling system of the present invention can help convenience of the user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A cooling system, comprising:
a filter member;
a dust collecting member configured to separate and collect dust remained in air passed through the filter member by increasing flow resistance of the air passed through the filter member;
a cooling fan configured to blow air passed through the dust collecting member toward a cooling object; and
a guide duct comprising:
an air inlet with the filter member mounted thereto configured to draw external air;
a dust collecting portion comprising the dust collecting member; and
a guide portion configured to guide the air passed through the dust collecting portion toward the cooling fan,
wherein the dust collecting member comprises:
an air supply hole configured to introduce the air drawn through the air inlet,
a curved passage collecting dust in the air passed through the supply hole by gravity or friction with an inside surface of the dust collecting member, and
a discharge hole configured to discharge the air toward the guide portion after the air drawn through the air inlet flows along the curved passage.

2. The cooling system as claimed in claim 1, wherein the air inlet or the dust collecting portion is formed in a recess portion in an upper side of the guide duct.

3. The cooling system as claimed in claim 1, further comprising a heat dissipation member provided between the cooling fan and the cooling object, the heat dissipation member having one side in contact with the cooling object and the other side provided with a plurality of heat dissipation plates or fins.

4. The cooling system as claimed in claim 1, wherein the air supply hole which introduces the air to the dust collecting member is provided in a side of the dust collecting member, and the discharge hole is formed in a center of the dust collecting member opened to an upper side of the dust collecting member.

5. The cooling system as claimed in claim 1, wherein:
the dust collecting member includes at least one deflector for reducing the mobility of the dust contained in drawn air by the air inlet; and
the deflector comprises at east one vertical wall on the bottom of the dust collecting member.

6. The cooling system as claimed in claim 1, wherein the dust collecting member further includes a friction member therein for increasing flow resistance of drawn air.

7. The cooling system as claimed in claim 6, wherein the friction member comprises a sponge attached to an inside of the dust collecting member.

8. The cooling system as claimed in claim 1, wherein the filter member mounted to the air inlet has a photo-catalyst coating applied thereto.

9. The cooling system as claimed in claim 8, wherein the photo-catalyst comprises titanium dioxide.

10. The cooling system as claimed in claim 8 or 9, wherein the air inlet includes a UV light source provided thereto for directing a UV beam toward the filter member.

11. The cooling system as claimed in claim 10, wherein:
the air inlet is formed in a recess portion in an upper side of the guide duct; and
the light source is at least one UV LED device provided on a PCB mounted to an inside of the recess portion.

12. The cooling system as claimed in claim 1, wherein at least one of the dust collecting member and the dust collecting portion of the guide duct is coated with a hydrophilic substance.

13. The cooling system as claimed in claim 3, wherein at least one of the cooling fan and the heat dissipation member is coated with fluorine.

14. The cooling system as claimed in claim 1, further comprising a control unit configured to calculate the difference between temperature $T_f$ measured and temperature $T_i$ stored in a memory configured to detect blocking of the guide duct and to issue an alarm or an alarm signal when the calculated difference is higher than a predetermined value.

15. The cooling system as claimed in claim 1, wherein the filter member or the dust collecting member is mounted to the guide duct, detachably.

* * * * *